US012603886B2

(12) United States Patent (10) Patent No.: US 12,603,886 B2
Rawat et al. (45) Date of Patent: Apr. 14, 2026

(54) SYSTEMS AND METHODS FOR AUTHENTICATING A RESOURCE SYSTEM

(71) Applicant: UnitedHealth Group Incorporated, Minnetonka, MN (US)

(72) Inventors: Saransh Rawat, Narnaul (IN); Mayank Kumar, Austin, TX (US); Valeria M. Goodman, Palm Bay, FL (US); Krystine D. Mahmood, Alpharetta, GA (US); Jatin Sachdeva, Delhi (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 44 days.

(21) Appl. No.: 18/584,132

(22) Filed: Feb. 22, 2024

(65) Prior Publication Data

US 2025/0274452 A1 Aug. 28, 2025

(51) Int. Cl.
*H04L 9/40* (2022.01)
*G06N 3/09* (2023.01)

(52) U.S. Cl.
CPC .............. *H04L 63/10* (2013.01); *G06N 3/09* (2023.01); *H04L 63/08* (2013.01)

(58) Field of Classification Search
CPC ............ H04L 63/10; H04L 63/08; H06N 3/09
USPC .......................................................... 726/4
See application file for complete search history.

(56) References Cited

U.S. PATENT DOCUMENTS

| | | | |
|---|---|---|---|
| 9,779,407 B2 | 10/2017 | Adjaoute et al. | |
| 2005/0044357 A1 | 2/2005 | Fano | |
| 2013/0006668 A1 | 1/2013 | Van Arkel et al. | |
| 2021/0287083 A1* | 9/2021 | Bharadwaj | G06N 3/08 |
| 2024/0054356 A1* | 2/2024 | Liu | G06N 20/00 |

OTHER PUBLICATIONS

Bhatnagar, Ritu, "Medical Credentialing with Insurance Companies: The all-in-one essential guide," Neolytix, no date but published before Jan. 23, 2024, retrieved from https://neolytix.com/medical-credentialing-with-insurance-companies (6 pages).
Physician Practice Specialists, "What is the insurance credentialing process?," PPS, published on May 11, retrieved from https://physicianpracticespecialists.com/credentialing/what-is-the-insurance-credentialing-process (3 pages).

(Continued)

*Primary Examiner* — Anthony D Brown
(74) *Attorney, Agent, or Firm* — Bookoff McAndrews, PLLC

(57) ABSTRACT

Systems and methods are disclosed for determining authenticity of a resource system. The method includes receiving a dataset that includes a first subset and a second subset associated with a first resource system; down-sampling the first subset but not the second subset; generating a first feature for a machine learning model based on the down-sampled first subset; generating a second feature for the machine learning model based on the second subset; generating, via input of at least one of the first feature or the second feature into the machine learning model that is trained to output a fraudulent measure, one or more data objects indicative of validating the fraudulent measure; and initiating performance of one or more prediction-based actions in response to the generating.

18 Claims, 8 Drawing Sheets

(56) References Cited

OTHER PUBLICATIONS

Seth, Neha, "A Simple Guide to Metrics for Calculating String Similarity," Analytics Vidhya, published on Aug. 1, 2022, retrieved from https://www.analyticsvidhya.com/blog/2021/02/a-simple-guide-to-metrics-for-calculating-string-similarity (14 pages).

* cited by examiner

700

TRAINING ALGORITHM 720

TRAINING COMPONENT 730

TRAINING DATA 712

STAGE INPUTS 714

KNOWN OUTCOMES 718

COMPARISON RESULTS 716

SYSTEMS AND METHODS FOR AUTHENTICATING A RESOURCE SYSTEM

TECHNICAL FIELD

This present disclosure relates generally to the field of data analytics and authentication. In particular, the present disclosure relates to analyzing various data sources using an analytical model to verify authenticity of resource systems.

BACKGROUND

In various industry sectors, the security of resource systems is often left vulnerable to unauthorized access and resultant use of provided resources. Authentication measures can be taken by the resource systems to protect their resources from unauthorized access and use, but conventional approaches suffer from shortcomings. For example, manual processing of requests for resources can put a lot of pressure on the resource systems, which may further cause system bottlenecks. Furthermore, such systems may be more susceptible to security breach, e.g., unauthorized entities masquerading as a legitimate system to pass through the authentication process and gain access to the systems and available resources. There is a need for a strong authentication mechanism that controls access to these systems and provided resources.

SUMMARY OF THE DISCLOSURE

The present disclosure solves the problem of system authentication and improves the security of conventional technologies.

The increasing dependence on digital platforms for communication, commerce, and storage of sensitive information has made computing systems vulnerable to unauthorized access. The conventional approaches to block unauthorized access and prevent fraud have not been entirely satisfactory. Accordingly, more advanced techniques to detect, deflect, or counteract attempts at unauthorized use of resources are needed.

In some embodiments, a computer-implemented method includes: receiving, by one or more processors, a dataset that includes a first subset and a second subset associated with a first resource system; down-sampling, by the one or more processors, the first subset but not the second subset; generating, by the one or more processors, a first feature for a machine learning model based on the down-sampled first subset; generating, by the one or more processors, a second feature for the machine learning model based on the second subset; generating, by the one or more processors and via input of at least one of the first feature or the second feature into the machine learning model that is trained to output a fraudulent measure, one or more data objects indicative of validating the fraudulent measure; and initiating, by the one or more processors, performance of one or more prediction-based actions in response to the generating.

In some embodiments, a system includes: one or more processors; and at least one non-transitory computer readable medium storing instructions which, when executed by the one or more processors, cause the one or more processors to perform operations including: receiving a dataset that includes a first subset and a second subset associated with a first resource system; down-sampling the first subset but not the second subset; generating a first feature for a machine learning model based on the down-sampled first subset; generating a second feature for the machine learning model based on the second subset; generating, via input of at least one of the first feature or the second feature into the machine learning model that is trained to output a fraudulent measure, one or more data objects indicative of validating the fraudulent measure; and initiating performance of one or more prediction-based actions in response to the generating.

In some embodiments, a non-transitory computer readable medium storing instructions which, when executed by one or more processors, cause the one or more processors to perform operations including: receiving a dataset that includes a first subset and a second subset associated with a first resource system; down-sampling the first subset but not the second subset; generating a first feature for a machine learning model based on the down-sampled first subset; generating a second feature for the machine learning model based on the second subset; generating, via input of at least one of the first feature or the second feature into the machine learning model that is trained to output a fraudulent measure, one or more data objects indicative of validating the fraudulent measure; and initiating performance of one or more prediction-based actions in response to the generating.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION OF EMBODIMENTS

Figure 1:
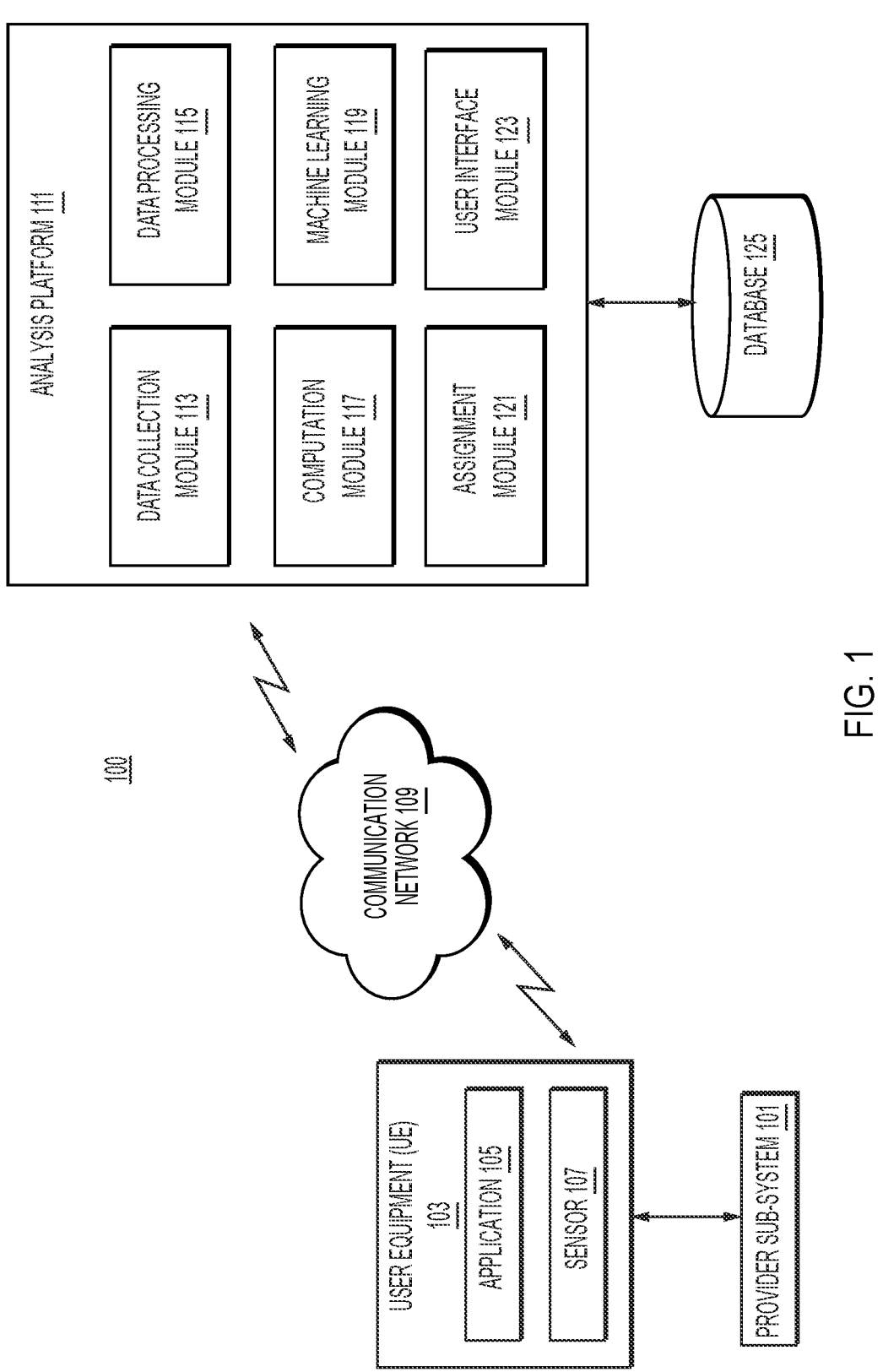
FIG. 1 is a diagram showing an example of a system for determining the authenticity of a resource system, according to aspects of the disclosure.

This present disclosure relates generally to the field of data analytics and authentication. In particular, the present disclosure relates to analyzing various data sources using an analytical model to verify authenticity of resource systems.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for predicting a buffer period for primacy timelines.

With bad actors (e.g., fraudulent providers) accosting businesses from all sides, many fraudulent requests slip under the radar until long after they have been completed. Online fraud has grown alongside network technologies, and threatens increased losses for businesses. The heavy-handed security measures may decrease fraud but they also cause companies to lose frustrated customers. A modern fraud detection and prevention mechanism is required that balance subtlety with efficiency. For example, submission of fraudulent claims (e.g., billing for medical treatments that were never performed, falsifying a patient's diagnosis to justify unnecessary tests or procedures, charging for a more expensive procedure than what was performed, etc.) by the service providers (e.g., non-registered providers) is a serious problem. Moreover, the service providers themselves may be illegitimate. The current processes for authenticating the claims and the providers are based on the submitted documents, and are technically challenged in considering other aspects of the service providers (e.g., flagging information, provider association information, service location information, members information, and various other attributes) to validate the service providers exhaustively. Furthermore, the current processes lack technical sophistication in generating risk scores for the service providers based on their level of authenticity, and deciding which service providers should go through a lean verification or an extensive onboarding process for ensuring an optimal path between faster onboarding and safeguarding against bad actors.

System 100 overcomes the shortcomings of the current technologies by leveraging additional verification data points and introducing an intelligent action-based approach for defining the level of verification or audit to be performed while onboarding service providers (e.g., first resource system(s) in the current disclosure). The system 100 introduces an exhaustive, systematic, and sophisticated process of onboarding providers that identifies fraudulent providers as upstream as possible and flags them so that provision of resources to such providers (e.g., monetary, non-monetary, etc.) is prevented, resulting in resource savings and efficiency in the authentication process.

More specifically, the present disclosure provides embodiments that solve the following technical shortcoming in the field of data analytics, security, and authentication, and that lead to significant technical improvements in the same field. For example, current methods of onboarding service providers simply focus on the new participating providers. System 100 of the present disclosure overcomes this technical flaw by providing an approach for automated document verification during the credentialing process and then applying the verification results to the claim adjudication process of any providers (including non-participating providers). Current processes are limited in their scope as they provide recommendations only to participating providers. System 100 overcomes this technical shortcoming by automatically generating recommendations for all providers (including non-participating providers) before claim adjudication. System 100 provides artificial intelligence (AI)-based engines (e.g., smart cases) prior to and/or during the claim adjudication process for any providers, manages and regulates the case creation, and monitors the status across multiple case management systems to capture the overall picture. Current methods perform address matching of the providers by utilizing a string similarity algorithm that is inefficient, computing resource-intensive, and error-prone. System 100 improves upon the current methods by leveraging a new unique similarity algorithm that applies a unique identification to different variations of a single feature (e.g., address) that improves computational efficiency and accuracy. Current processes generally utilize a horizontal feature scoring and aggregation that does not take into account all the features of a claim. System 100 overcomes this problem by leveraging a vertical feature aggregation technique to allow for an enhanced, more comprehensive provider risk determination. The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 is a diagram showing an example of a system for determining the authenticity of a resource system, according to aspects of the disclosure. FIG. 1 includes the system 100 that comprises provider sub-system 101, user equipment (UE) 103a-103n (collectively referred to as UE 103) that includes applications 105a-105n (collectively referred to as an application 105) and sensors 107a-107n (collectively referred to as a sensor 107), a communication network 109, an analysis platform 111, and a database 125. System 100 integrates fraud detection, decisioning, and mitigation measures into the broader user journey to ensure legitimate providers never feel the friction of fraud prevention while illegitimate providers are comprehensively examined. For example, system 100 evaluates every session for fraud risk and implement rules that can kick off mitigation at any point throughout the provider's journey without disturbing legitimate providers. System 100 also sets up automated, effective fraud mitigation by taking advantage of centralized fraud decisioning and orchestration. The traditional onboarding approaches merely rely only on documents (e.g., W9 forms and license) verification whereas the system 100 provides holistic evaluation using internal as well as external data, risk evaluation and action recommendation utilizing AI and/or machine learning models, and smart management of investigations across multiple verification units using a management system.

In one embodiment, provider sub-system 101 (also referred to as a first resource system(s) herein) is a service provider (e.g., hospital(s), private clinic(s), rehabilitation center(s), billing-related service provider(s), hospice provider(s), etc.), or a system that is managed or hosted by the service provider, that submits claims for the service(s) rendered to one or more patients. In one instance, the provider sub-system 101 is registered providers, unregistered providers, visiting providers, returning providers, or authorized providers that submit medical claims for reimbursement. Prior to, during, or subsequent to the patients being treated by the provider sub-system 101, the provider sub-system 101 utilizes the UE 103 to submit medical claims to the analysis platform 111 for processing. In one instance, the medical claims includes current procedural terminology (CPT) treatment codes, ICD9 diagnostic codes, data relating to the patient (e.g., medical records, current health conditions, medical history, or personal information, etc.), data relating to the provider sub-system 101 (e.g., license number, contact information, location information, employee information, insurance information, historical claims information, etc.) or any other relevant information.

In one embodiment, the UE 103 includes, but is not restricted to, any type of mobile terminal, wireless terminal, fixed terminal, or portable terminal. Examples of the UE 103 include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 facilitates various input means for receiving and generating information, including, but not restricted to, a touch screen capability, a keyboard and keypad data entry, a voice-based input mechanism, and the like. The UE 103 is also configured with different features for generating, sharing, and viewing of visual content. Any known and future implementations of the UE 103 are also applicable.

In one embodiment, the application 105 includes various applications such as, but not restricted to, content provisioning applications, software applications, notification services, networking applications, multimedia applications, media player applications, camera/imaging applications, application services, storage services, contextual information determination services, location-based services, social networking services, and the like. In one embodiment, one of the application 105 at the UE 103 acts as a client for the analysis platform 111 and performs one or more functions associated with the functions of the analysis platform 111 by interacting with the analysis platform 111 over the communication network 109.

By way of example, each sensor 107 includes any type of sensor. In one embodiment, the sensors 107 include, for example, a network detection sensor for detecting wireless signals or receivers for different short-range communications (e.g., Bluetooth, Wi-Fi, Li-Fi, near field communication (NFC), etc.) from the communication network 109, a global positioning sensor for gathering location data (e.g., location associated with the first resource systems), a camera/imaging sensor for gathering image data (e.g., images of invoices and claims from the first resource systems, investigation reports, etc.), an audio recorder for gathering audio data (e.g., recordings of medical treatments, medical diagnosis, investigations, etc.), and the like.

In one embodiment, various elements of the system 100 communicate with each other through the communication network 109. The communication network 109 supports a variety of different communication protocols and communication techniques. In one embodiment, the communication network 109 allows the UE 103 to communicate with the analysis platform 111. The communication network 109 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, the analysis platform 111 is a platform with multiple interconnected components. The analysis platform 111 includes one or more servers, intelligent networking devices, computing devices, components, and corresponding software for authenticating first resource system(s). In one embodiment, the analysis platform 111 receives requests from a first resource system (e.g., provider sub-system 101). The analysis platform 111 processes the requests, and performs down-sampling and/or scoring on the request for generating one or more features. The analysis platform 111 inputs one or more features into the machine learning model for generating recommendations (e.g., recommended actions). The analysis platform 111 receives recommendations for authenticating the first resource system from the machine learning model. The analysis platform 111 transmits the recommendations to a second resource system (e.g., case management system (CMS) manager) for performing the recommended actions. The analysis platform 111 receives results from the second resource system, and determines the first resource system as (i) fraudulent for hard denying or (ii) genuine for onboarding.

In one embodiment, the analysis platform 111 comprises a data collection module 113, a data processing module 115, a computation module 117, a machine learning module 119, an assignment module 121, a user interface module 123, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one embodiment, the data collection module 113 collects, in real-time or near real-time, relevant data associated with the first resource systems and/or patients associated with the request (e.g., medical claim request) through various data collection techniques. In one embodiment, the data collection module 113 uses a web-crawling component to access various data sources (e.g., database 125) to collect the relevant data. In one embodiment, the data collection module 113 includes various software applications (e.g., data mining applications in Extended Meta Language (XML)) that automatically search for and return relevant data associated with the first resource systems and/or the patients. In another embodiment, the data collection module 113 collects images of claims (e.g., medical claims) uploaded by the first resource systems via the user interface of UE 103.

In one embodiment, the data collection module 113 transmits the collected data to the data processing module 115 for data standardization and/or data cleansing. In one embodiment, data standardization includes standardizing and unifying data. The data processing module 115 converts the collected data into a common format (e.g., machine readable form), that is easily processed by other modules and platforms. In one embodiment, the data cleansing technique includes removing or correcting erroneous data (e.g., typographical errors) or validating and correcting values against a known list of entities. The data cleansing technique also includes cleaning data by cross-checking the data with a validated data set, standardizing the data by changing a reference data set to a new standard (e.g., use of standard codes), and/or the like. Additionally, the data cleansing technique includes data enhancement, where data is made more complete by adding related information.

The data processing module 115 transmits the processed data to the computation module 117. In one embodiment, the computation module 117 performs a down-sampling of the first subset associated with the first resource system to determine their similarity with stored data for generating a first feature (discussed in the description of FIG. 5). The computation module 117 utilizes various equations and data processing techniques during the down-sampling process. The computation module 117 inputs the first feature and/or second feature into a machine learning model trained and managed by the machine learning module 119.

In one embodiment, the machine learning module 119 is configured for supervised machine learning, utilizing training data (e.g., training data 712 illustrated in the training flow chart 700). The machine learning module 119 processes the first feature and/or a second feature based on a second subset associated with the resource system to generate provider-level score(s) based on feature comparison involving differential weighting of features and various comparison techniques (discussed in the description of FIG. 6). The trained model is configured for generating recommendations for determining the authenticity of the first resource system(s). The recommendations include recommended actions, for example, document review utilizing optical character recognition techniques (e.g., review of surgical logs, medical records, W9 forms, etc.), review of locations associated with the first resource system utilizing location-based technologies, review of any relevant information associated with the first resource system (e.g., performing member calls or interview, performing provider calls or interview, performing calls or interview of referring entities, performing onsite visits, etc.), or any other type of actions for authenticating the first resource systems. In one example embodiment, the machine learning module 119 performs model training using training data (e.g., data from other modules, that contains input and correct output, to allow the model to learn over time). The training is performed based on the deviation of a processed result from a documented result when the inputs are fed into the machine learning model (e.g., an algorithm measures its accuracy through the loss function, adjusting until the error has been sufficiently minimized). In one embodiment, the machine learning module 119 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 119 implements various machine learning techniques, e.g., neural network (e.g., recurrent neural networks, graph convolutional neural networks, deep learning neural networks), decision tree learning, association rule learning, inductive programming logic, K-nearest neighbors, cox proportional hazards model, support vector machines, Bayesian models, Gradient boosted machines (GBM), LightGBM (LGBM), Xtra tree classifier, etc. Implementation of the machine learning module 119 is discussed in detail below.

The assignment module 121 receives the recommendations from the machine learning model and the provider-level score(s) from the machine learning module 119. In one embodiment, the assignment module 121 compares the provider-level score(s) to a pre-determined threshold for determining whether to transmit the recommendations to the processing engines for further audit of first resource systems (e.g., CMS1, CMS2, CMS3 of FIG. 3). For example, the assignment module 121 transmits the recommendations to the processing engines upon determining the provider-level score(s) exceeds the pre-determined threshold. In one embodiment, the assignment module 121 assigns the recommendations to processing engines for performing the recommended actions. The assignment module 121 assigns the recommended actions to the processing engines for further audit of first resource systems based on the function carried out by the processing engines (e.g., processing engine CMS1 includes a specialized mechanism for billing address and/or servicing address validation, processing engine CMS2 includes a specialized mechanism for determining an association between the first resource systems and the flagged first resource systems, processing engine CMS3 includes a specialized mechanism for name-based validation, and so on). In another embodiment, the assignment module 121 automatically creates processing engines for performing the recommended actions (e.g., based on the requirements of the recommended actions). The processing engines perform the recommended actions to generate a result for authenticating or flagging the first resource system.

In one embodiment, the user interface module 123 receives the provider-level score(s) from computation module 117, the recommendations from the machine learning model, and/or the result(s) from the assignment module 121. The user interface module 123 enables a presentation of a graphical user interface (GUI) in the UE 103 that facilitates visualization of the provider-level score(s), recommendations, results, and any other relevant information (e.g., medical claims, medical records of the patients, etc.). In one embodiment, the user interface module 123 employs various application programming interfaces (APIs) or other function calls corresponding to the application 105 on the UE 103, thus enabling the display of graphics primitives such as icons, bar graphs, menus, buttons, data entry fields, etc. The user interface module 123 causes interfacing of guidance information to include, at least in part, one or more annotations, audio messages, video messages, or a combination thereof pertaining to the generated scores, recommended actions, and/or results. The user interface module 123 also comprises a variety of interfaces, for example, interfaces for data input and output devices, referred to as I/O devices, storage devices, and the like. Still further, the user interface module 123 is configured to operate in connection with augmented reality (AR) processing techniques, wherein various applications, graphic elements, and features interact.

The above presented modules and components of the analysis platform 111 are implemented in hardware, firmware, software, or a combination thereof. Though depicted as a separate entity in FIG. 1, it is contemplated that the analysis platform 111 is also implemented for direct operation by the respective UE 103. As such, the analysis platform 111 generates direct signal inputs by way of the operating system of the UE 103. In another embodiment, one or more of the modules 113-123 are implemented for operation by the respective UEs, as the analysis platform 111. The various executions presented herein contemplate any and all arrangements and models.

In one embodiment, the database 125 is any type of database, such as relational, hierarchical, object-oriented, and/or the like, wherein data are organized in any suitable manner, including data tables or lookup tables. In one embodiment, the database 125 accesses various data sources and/or stores content associated with the first resource systems, the UE 103, and the analysis platform 111, and manages multiple types of information that provide means for aiding in the content provisioning and sharing process. In one instance, the database 125 stores various information related to the first resource system (e.g., historical claims data, network data, flagged provider information, investigation data, location data, provider network data, provider association data, etc.). It is understood that any other suitable data may be included in the database 125. In another embodiment, the database 125 includes a machine learning based training database with a pre-defined mapping defining a relationship between various input parameters and output parameters based on various statistical methods. For example, the training database includes machine learning algorithms to learn mappings between input parameters related to the first resource systems. In one example embodiment, the training database includes a dataset that includes data collections that are not subject-specific, e.g., data collections based on population-wide observations, local, regional or super-regional observations, and the like. The training database is routinely updated and/or supplemented based on machine learning methods.

By way of example, the UE 103 and the analysis platform 111 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
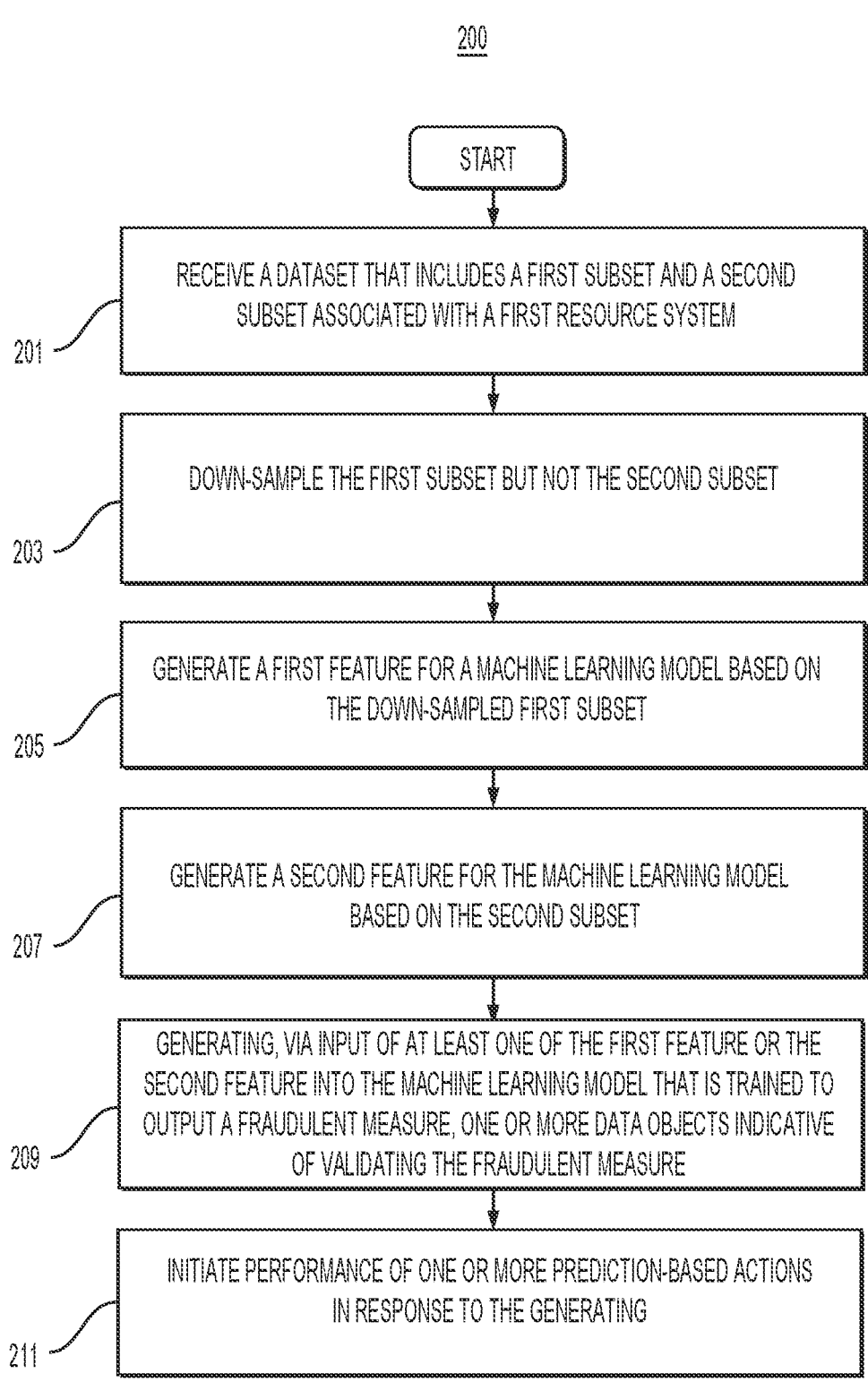
FIG. 2 is a flowchart of a process for verifying the authenticity of a resource system, according to aspects of the disclosure.
Figure 8:
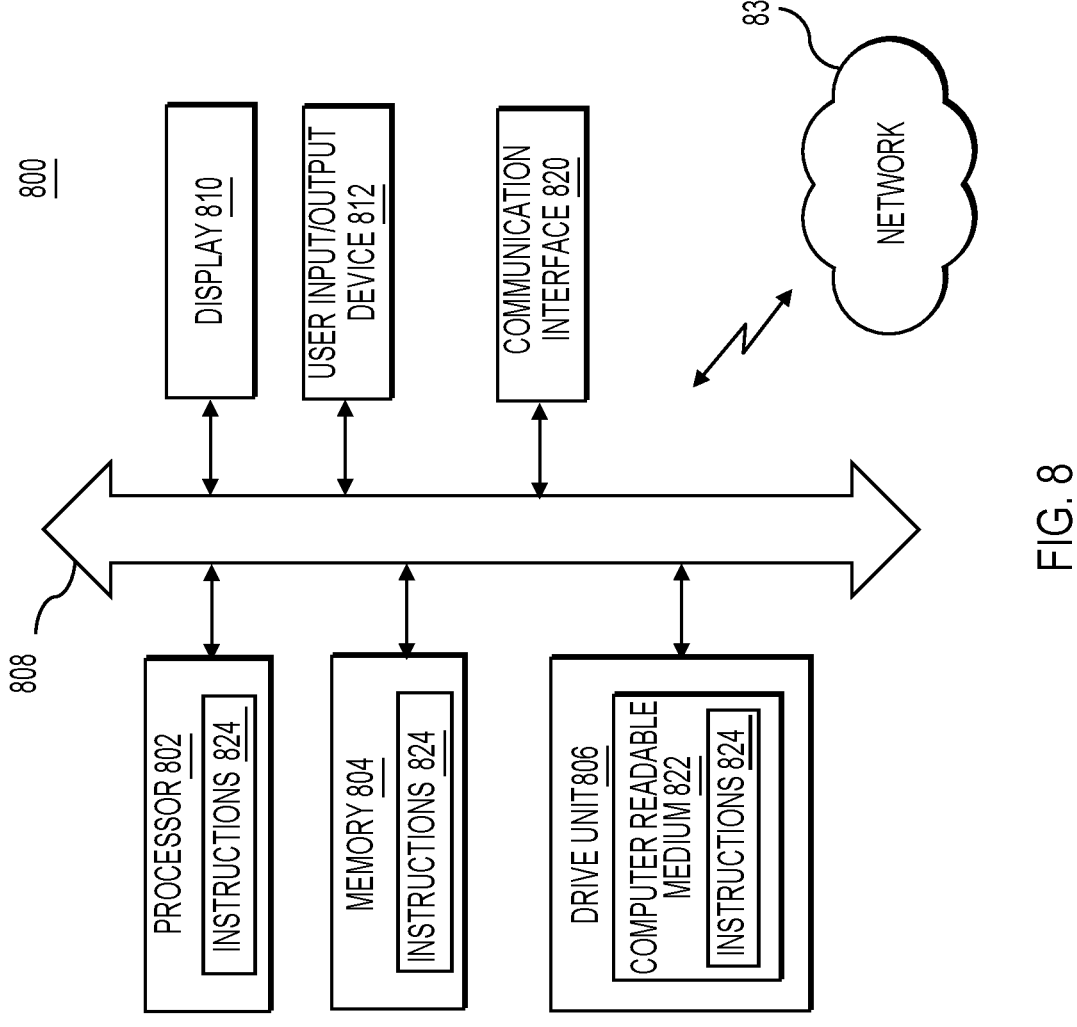
FIG. 8 illustrates an implementation of a computer system that executes techniques presented herein.

FIG. 2 is a flowchart of a process for verifying authenticity of a resource system (e.g., a first resource system), according to aspects of the disclosure. In various embodiments, the analysis platform 111 and/or any of the modules 113-123 performs one or more portions of the process 200 and are implemented using, for instance, a chip set including a processor and a memory as shown in FIG. 8. As such, the analysis platform 111 and/or any of modules 113-123 provide means for accomplishing various parts of the process 200, as well as means for accomplishing embodiments of other processes described herein in conjunction with other components of the system 100. Although the process 200 is illustrated and described as a sequence of steps, it is contemplated that various embodiments of the process 200 are performed in any order or combination and need not include all of the illustrated steps.

In step 201, the analysis platform 111 receives, via processor 802 (which may include one or more processors), a dataset that includes a first subset and a second subset associated with a first resource system (e.g., provider subsystem 101). In one instance, the dataset includes past request data, past fraud data, investigation data, location data, network data, association data, or flagged first resource systems data.

In step 203, the analysis platform 111 down-samples, via processor 802, the first subset but not the second subset. In one instance, down-sampling the first subset includes standardizing the first subset, and transforming the standardized first subset into a unique hash key for matching with a stored data string. This process of standardizing and hashing is discussed in detail in the description for FIG. 5.

In step 205, the analysis platform 111 generates, via processor 802, a first feature for a machine learning model based on the down-sampled first subset. In one embodiment, the machine learning model is a supervised machine learning model. In one embodiment, the analysis platform 111 determines whether the unique hash key matches the stored data string, and generates the first feature indicating the match for inputting into the machine learning model. In one embodiment, the first feature is associated with one or more requests by the first resource system (e.g., claims from a healthcare service provider).

In step 207, the analysis platform 111 generates, via processor 802, a second feature for the machine learning model based on the second subset. In one embodiment, the second feature is associated with one or more requests by the first resource system. In one embodiment, the analysis platform 111 determines first risk score(s) based on the first feature and the second feature. The analysis platform 111 then determines a second risk score for the first resource system based on the first risk score(s). In one instance, the machine learning model may generate the second risk score independent of the first risk score(s). The analysis platform 111 compares the second risk score to a pre-determined threshold for determining whether to transmit the data object(s) to second resource systems (e.g., one or more of the CMS manager or the individual management system(s) (CMS1, CMS2, CMS3) of FIG. 3).

In step 209, the analysis platform 111 generates, via processor 802 and via input of the first feature and/or the second feature into the machine learning model that is trained to output a fraudulent measure, data object(s) indicative of validating the fraudulent measure. In one embodiment, the data object(s) include recommended action(s) for verifying the authenticity of the first resource system. In one embodiment, the recommended action(s) include document review utilizing an optical character recognition technique, review of one or more locations associated with the first resource system utilizing a location-based technology, review of one or more entities associated with the dataset, or any other type of actions for authentication the first resource system.

In step 211, the analysis platform 111 initiates, via processor 802, the performance of one or more prediction-based actions in response to the generating. In one embodiment, the analysis platform 111 transmits recommendation(s) to the second resource system(s) for performing the recommended action(s) upon determining the second risk score is above the pre-determined threshold. The analysis platform 111 receives result(s) from the second resource system(s) that performs the recommended action(s). The analysis platform 111 determines the first resource system as fraudulent or genuine based on the result(s). In another embodiment, the analysis platform 111 monitors the progress of each of the recommended action(s) at the second resource system(s), and queries the second resource system upon determining a pre-determined time threshold associated with a corresponding recommended action has passed.

Figure 3:
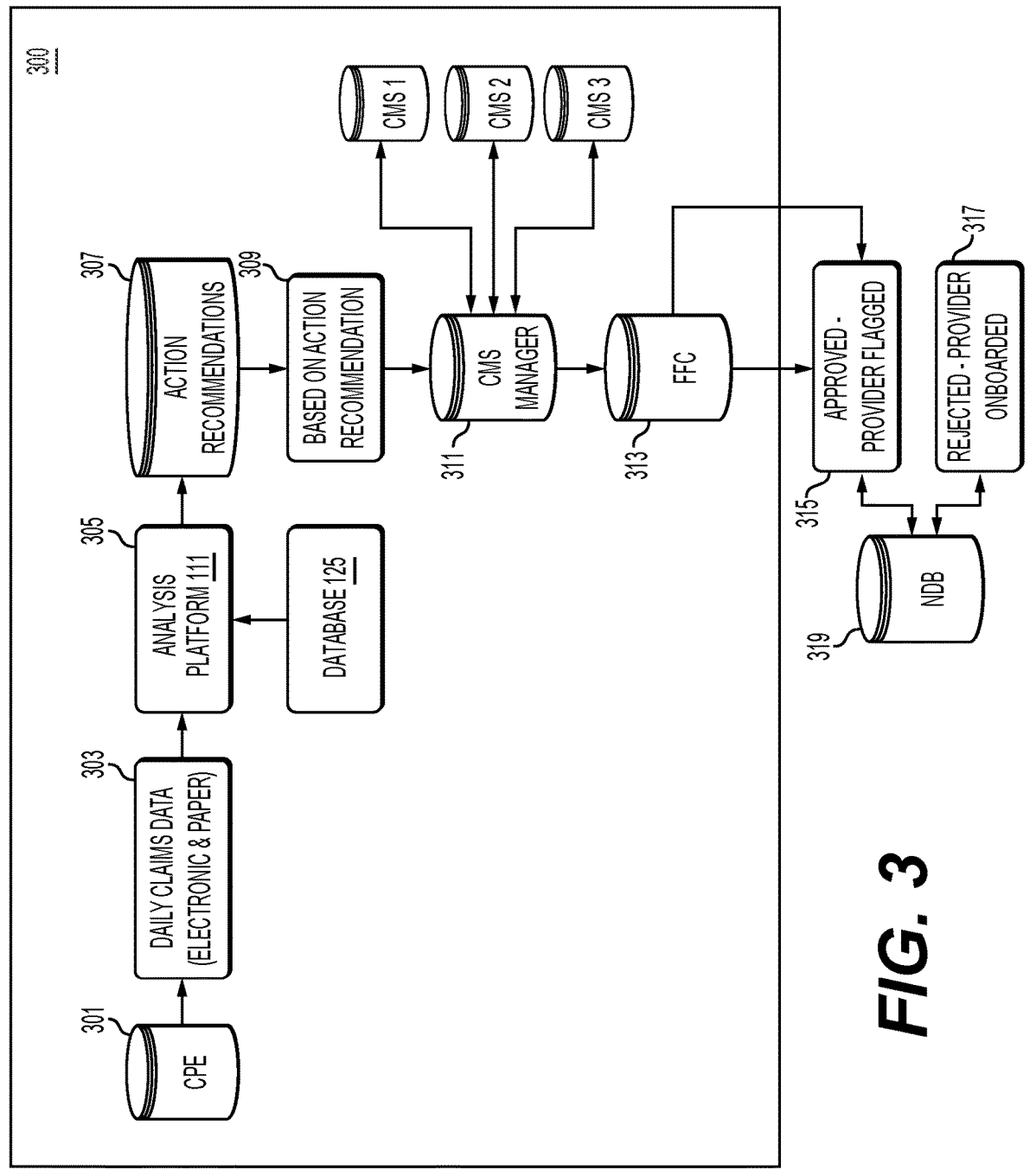
FIG. 3 is a flow diagram that illustrates the process for determining a resource system as fraudulent or genuine based on result(s) associated with one or more recommended actions, according to aspects of the disclosure.

FIG. 3 is a flow diagram that illustrates the process 300 for determining a resource system (e.g., a first resource system) as fraudulent or genuine based on result(s) from one or more recommended actions, according to aspect of the disclosure. In this example embodiment, in step 301, the claim processing engine (CPE) receives claims data (e.g., dataset) from a first resource system (e.g., provider sub-system 101). In one instance, the CPE is a claim intake platform that ingests various types of claims submitted by the first resource system. The CPE receives claim data in real-time, near real-time, or on a pre-scheduled basis (e.g., hourly, daily, weekly, etc.). In step 303, the CPE transmits the claims data to the analysis platform 111 for processing.

In step 305, the analysis platform 111 processes the claims data, and accesses relevant information associated with the claims data from various data sources (e.g., database 125). In one instance, the relevant data includes past request data, past fraud data, investigation data, location data, network data, association data, or flagged first resource systems data. The analysis platform 111 determines one or more features of the claims data based on down-sampling and/or scoring mechanisms. In one instance, each of one or more features defines a category assigned to the first resource system as described in FIG. 4. The analysis platform 111 processes, using a trained machine learning model, one or more features to generate one or more recommendations (e.g., recommended actions) for verifying the authenticity of the first resource system (step 307). In one instance, the recommended actions include but are not limited to document review utilizing optical character recognition techniques, review of one or more locations associated with the first resource system utilizing location-based technologies, or review of one or more entities associated with a request (e.g., calling to verify the authenticity of the first resource system, conduct onsite visits to confirm the address of the first resource system, performing documentation review, etc.).

In step 309, the analysis platform 111 transmits one or more recommendations to a case management system (CMS) manager (e.g., a second resource system) for performing one or more recommended actions. In one instance, the analysis platform 111 transmits one or more recommendations to the CMS manager upon determining the risk score(s) generated by the methods described herein is above the pre-determined threshold level.

In step 311, the CMS manager interacts with a plurality of CMS sub-systems (e.g., CMS1, CMS2, CMS3, . . . ) or performs automatic case creation for assigning one or more recommendations. Each of the CMS sub-systems is expert in conducting independent case reviews on a specific subject. The one or more recommendations are assigned to the CMS sub-systems based on data types and the requirements of the recommendations. The CMS manager monitors the progress of each of the one or more recommended actions and queries the CMS sub-systems upon determining the pre-determined time threshold associated with a corresponding recommended action has passed. The CMS manager receives result(s) from the CMS sub-systems, the results determined by the CMS sub-systems based on one or more recommended actions.

In one instance, the CMS manager transmits the result(s) to the analysis platform 111 for determining the first resource system as either fraudulent for hard denying or genuine for onboarding. In another instance, at step 313, the CMS manager transmits suspicious findings (e.g., provider-level score(s) was above the pre-determined threshold, the unique hash key does not match the stored data string, etc.) to a governance committee (e.g., FFC) for further review. The governance committee decides based on the investigative findings to either hard deny the first resource system (step 315) or authenticate the first resource system (step 317). In step 319, once the FFC makes the decision, the decision is stored in the network database (NDB) for future access.

Figure 4:
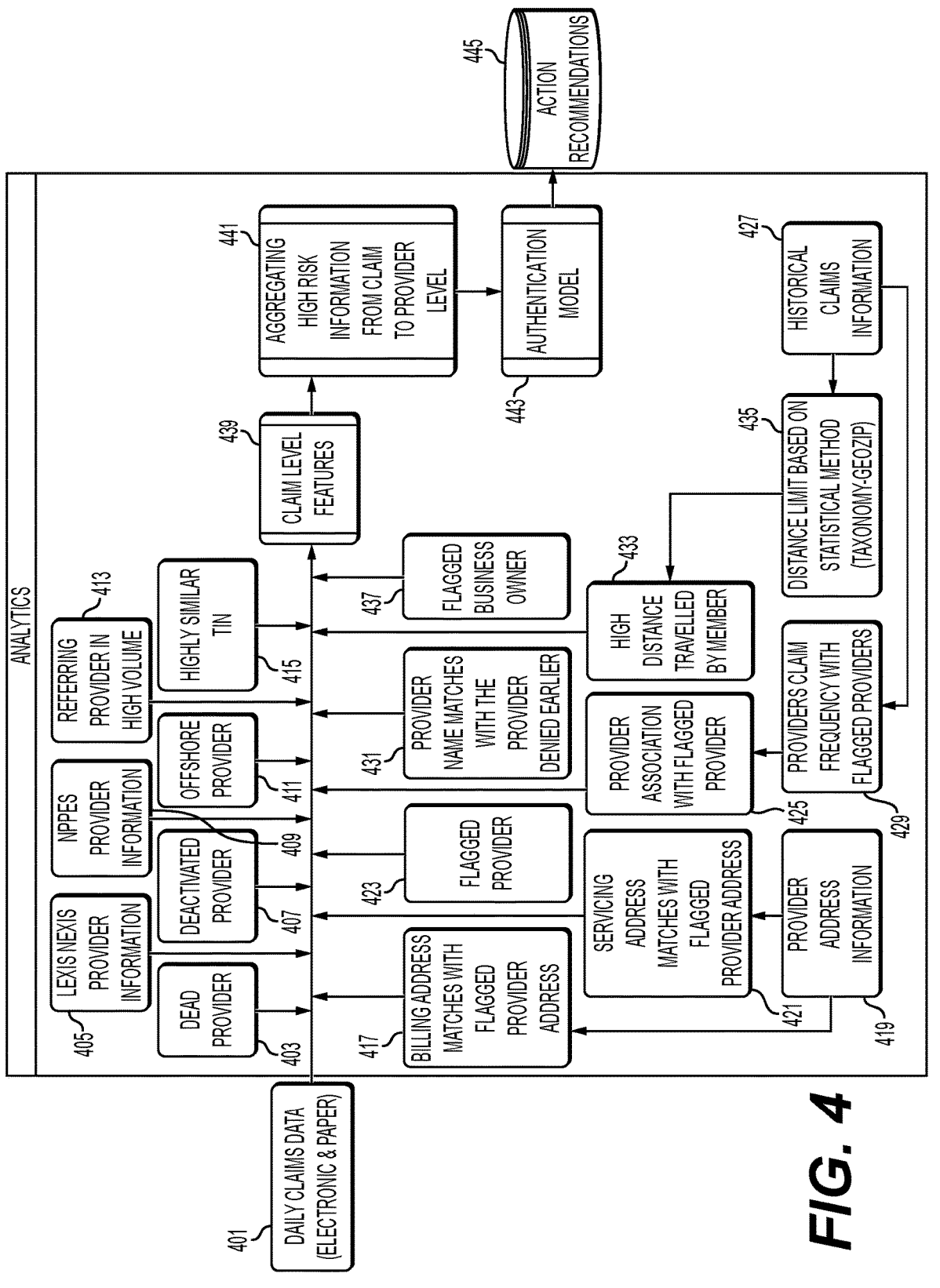
FIG. 4 is a flow diagram that illustrates the data analysis process for authenticating a resource system, according to aspects of the disclosure.

FIG. 4 is a flow diagram that illustrates the data analysis process for authenticating a resource system (e.g., a first resource system), according to aspect of the disclosure. In step 401, the analysis platform 111 (shown as "ANALYTICS" in FIG. 4) receives, in real-time or near real-time, claims data or any relevant data associated with the first resource system (e.g., provider sub-system 101) from various data sources (e.g., database 125). The analysis platform 111 processes the data to determine various features associated with the data. The various features include but are not limited to:

1. Dead provider 403: The analysis platform 111 checks the data to determine whether the first resource systems (e.g., companies, healthcare providers, etc.) submitting the claims are dissolved. In one instance, when claims are submitted by individuals, the analysis platform 111 checks the data to determine whether the individuals are dead or alive.

2. Third-party provider information 405: The analysis platform 111 accesses a plurality of third-party service providers that collect data. The analysis platform 111 receives relevant data associated with the first resource systems from the third-party service providers and processes the data to authenticate the first resource system. For example, the analysis platform 111 compares the data provided by the third-party service providers against the claims data. If the information matches the first resource system is authenticated. However, if the information does not match (e.g., claims data states Mr. X is the owner, but the data provided by the third-party service providers states the owner is Mr. Y), then there is a suspicion.

3. Deactivated Provider 407: Deactivated Provider 407: The analysis platform 111 receives, in real-time or near real-time, information pertaining to the deactivation of the first resource systems from a data source (e.g., Centers for Medicare & Medicaid Services (CMS)). The analysis platform 111 processes the claims data to determine whether the first resource systems submitting the claims are still active or have been deactivated. If the first resource system has been deactivated and the claims are being submitted by the deactivated first resource system, then there is a likelihood of fraud.

4. National Plan and Provider Enumeration System (NPPES) provider information 409: The analysis platform 111 receives NPPES provider information from a data source (e.g., CMS). The analysis platform 111 compares the NPPES provider information with claims data. If the NPPES provider information matches, the first resource system is authenticated. However, if the NPPES provider information does not match, then there is a suspicion of fraud.

5. Offshore provider 411: The analysis platform 111 checks the claims data for any offshore healthcare providers because it is rare for a patient to travel thousands of miles to undergo a simple treatment, for example, patient A traveling from the U.S. to France to undergo a simple medical treatment. The existence of offshore healthcare providers indicates a likelihood of fraud.

6. Referring provider in high volume 413: The analysis platform 111 processes the claims data to check for entities (e.g., medical professional) that repeatedly refers patients to the same healthcare providers (e.g., illegitimate providers). The analysis platform 111 determines the claims to be fraudulent when an entity is referring patients to the same illegitimate healthcare providers in high volume.

7. Highly similar Taxpayer Identification Number (TIN) 415: The analysis platform 111 flags fraudulent first resource systems, and blocks them from submitting claims by utilizing their TIN numbers. However, the flagged first resource systems are changing their TIN numbers (e.g., changing one digit in their TIN numbers to generate new TIN numbers) to submit new claims. The analysis platform 111 processes the claims data to identify highly similar TIN numbers based on pre-configured rules and flags the claims with highly similar TIN numbers as potentially fraudulent and need additional verification.

8. Billing address matches with flagged provider address 417: The analysis platform 111 processes the address information 419 in the claims data, and compares the billing address of the first resource system with the stored address of the first resource systems previously identified as fraudulent. If the billing address matches with the stored address, the analysis platform 111 labels the claims as potentially fraudulent and needs additional verification. This process is discussed in detail in the description for FIG. 5.

9. Servicing address matches with flagged provider address 421: The analysis platform 111 processes the address information 419 in claims data, and compares the servicing address of the first resource system with the stored address of the first resource systems previously identified as fraudulent. If the servicing address matches with the stored address, the analysis platform 111 labels the claims as potentially fraudulent and needs additional verification. This process is discussed in detail in the description for FIG. 5.

10. Flagged provider 423: The analysis platform 111 checks the claims data to verify whether previously flagged first resource systems are submitting the claims.

11. Provider association with flagged provider 425: The analysis platform 111 processes historical claims information 427 and claim frequency with flagged providers 429 to track any association between the first resource systems submitting the claims and any previously flagged first resource systems.

12. Provider name matches with the provider denied earlier 431: The analysis platform 111 processes the claims data to compare the name of the first resource systems with the name of the previously flagged first resource systems.

13. High distance traveled by a member 433: Ideally members (e.g., patients) travel to a service provider within their vicinity for treatments, unless the treatment is complex and needs to be administered by a specialist. The analysis platform 111 processes historical claims information 427 and distance limit based on statistical method 435 to determine whether the members needed to travel long distances to receive the treatments. For example, analysis platform 111 notices that the member traveled hundreds of miles to undergo a simple treatment, and flags the claims as potentially fraudulent and requires additional verification.

14. Flagged business owners 437: The analysis platform 111 processes the claims data to determine whether the first resource systems submitting the claims are owned by a proprietor who also owns other flagged first resource system(s). For example, company A owned by Mr. X submits the claims. The analysis platform 111 processes the claims and relevant data to determine Mr. X also owns company B which was previously flagged as fraudulent. Accordingly, the analysis platform 111 flags the claims as potentially fraudulent and requires additional verification.

In step 439, the analysis platform 111 determines the claim-level features from the features 403 through 437 based on the attributes of the claim data. In step 441, the analysis platform 111 aggregates high-risk information from the claim level to the resource system level (details of this process are provided in the description for FIG. 6). In step 443, the analysis platform 111, via an authentication model, recommends an extensive onboarding process for the first resource system with an aggregated risk score that is higher than a predetermined threshold level (to this end, the authentication model may generate one or more recommendations, or recommended actions, that are to be performed or managed by a CMS manager, e.g., a second resource system, for verifying the authenticity of the first resource system) or a lean verification process for the first resource system with an aggregated risk score that is lower than the predetermined threshold level. In step 445, the recommended actions are stored.

Figure 5:
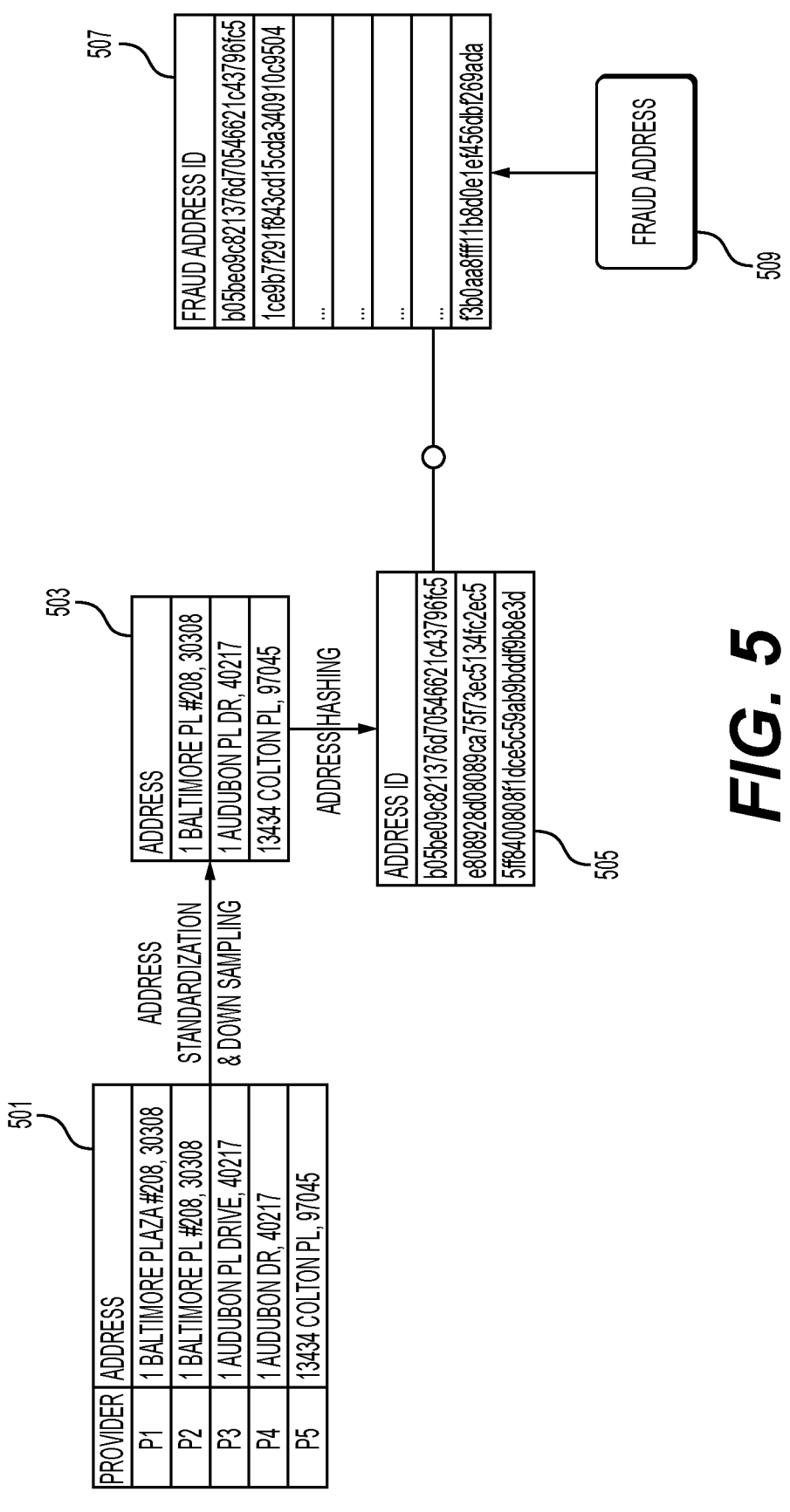
FIG. 5 is a diagram that illustrates the standardization and down-sampling of datasets associated with a resource system, according to aspects of the disclosure.

FIG. 5 is a diagram that illustrates the standardization and down-sampling of datasets associated with a resource system (e.g., a first resource system), according to aspect of the disclosure. In this example embodiment, the analysis platform 111 performs standardization and down-sampling on address information associated with the first resource system. It should be understood that standardization and down-sampling may be performed on any relevant data associated with the first resource system.

In one instance, the analysis platform 111 receives, in real-time or near real-time, claims request from UE 103 associated with the first resource system (e.g., provider sub-system 101). The analysis platform 111 processes the claims request to verify relevant data (e.g., address information) associated with the first resource system to determine their authenticity. The analysis platform 111 performs standardization and down-sampling of the address information to determine whether the address information of the first resource system matches with the addresses corresponding to suspicious first resource systems.

As illustrated, in step 501, the analysis platform 111 processes address information for the first resource system. The analysis platform 111 performs standardization on the address information to check and correct the address information to a standard format. The analysis platform 111 also performs down-sampling on the address information to reduce the computational load on processors (e.g., processors 802). By reducing the number of samples, down-sampling enables faster processing times, making it invaluable in real-time applications. For example, the analysis platform 111 standardizes and down-samples addresses "1 Baltimore Plaza, #208, 30308" and "1 Baltimore PL #208, 30308" to "1 Baltimore PL #208, 30308" (step 503). Down-sampling enhances data efficiency, and reduces the storage space required for data allowing for more efficient data transmission, storage, and processing.

In step 505, the analysis platform 111 performs hashing on the standardized data. During this process, the standardized address string is transformed into a hash key (i.e., 1 unique hash key represents different string variation of a single address). In step 507, the analysis platform 111 performs one-to-one mapping and compares the unique hash key with the stored addresses 509 associated with fraudulent first resource systems. If the unique hash key matches the stored addresses, the analysis platform 111 generates a data object indicating the match as a feature for inputting into the machine learning model.

The conventional systems performed string similarity between two addresses, and if the similarity is above a certain threshold then conclude the addresses are the same. However, performing string similarity between an address associated with the claim and numerous other addresses belonging to suspicious providers is time-consuming, inefficient, and error-prone. The analysis platform 111 of system 100 by performing one-to-one mapping instead of calculating string similarity results in time-optimization while calculating address-based features, saves computing resources, and attains higher accuracy during matching. In one embodiment, the analysis platform 111 maps the latitude and longitude information corresponding to the addresses (e.g., a member's residential address and the provider's service address) and finds the distance between them to determine the authenticity of the claims.

Figure 6:
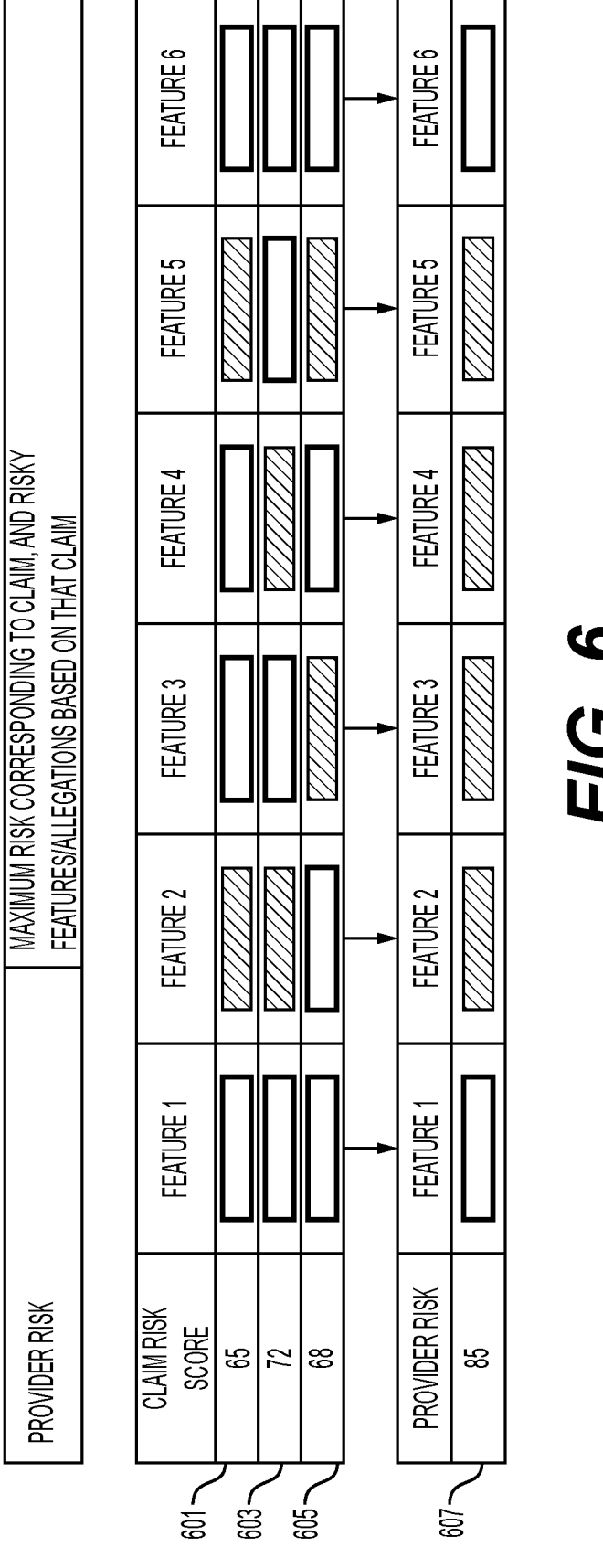
FIG. 6 is a diagram that illustrates a risk-scoring mechanism for a resource system, according to aspect of the disclosure.

FIG. 6 is a diagram that illustrates a risk-scoring mechanism for a resource system, according to aspect of the disclosure. In this example embodiment, a risk corresponding to three claims (e.g., claims 601, 603, and 605) is evaluated based on six features. It should be understood any number of claims associated with the first resource system (e.g., a provider sub-system 101) may be evaluated on any suitable features for generating risk scores.

In one instance, the analysis platform 111 receives, in real-time or near real-time, claims 601, 603, and 605 from UE 103 associated with the first resource system. The analysis platform 111 processes claims 601, 603, and 605 to determine the features (e.g., features 1 through 6) associated with the claims. In one instance, the features include past request data, past fraud data, investigation data, location data, network data, association data, flagged first resource systems data and/or any other relevant information.

The analysis platform 111 performs horizontal feature scoring for each of the claims 601, 603, and 605. In one instance, the analysis platform 111 captures one feature at a time for claim 601, and determines that features 2 and 5 have allegations (e.g., suspicions that are represented by marked brackets). The analysis platform 111 also captures one feature at a time for claim 603, and determines that features 2 and 4 have allegations. Similarly, analysis platform 111 captures one feature at a time for claim 605, and determines that features 3 and 5 have allegations. In one instance, each of the features has a pre-determined weightage, and the analysis platform 111 generates a risk score for each of the claims 601, 603, and 605 based on the pre-determined weightage and preconfigured rules. For example, claim 601 is assigned a risk score of 65, claim 603 is assigned a risk score of 72, and claim 605 is assigned a risk score of 68.

The analysis platform 111 performs vertical feature aggregation for each of the features (e.g., features 1 through 6) of the claims (e.g., claims 601, 603, and 605) to determine an overall feature risk for the first resource system. The analysis platform 111 performs feature-by-feature aggregation to generate record 607. For example, since features 1 and 6 for claims 601, 603, and 605 do not have any allegations, the vertical feature aggregation of each of features 1 and 6 results in a positive output indicating that each of these features is not suspicious. In one instance, if there is an allegation in a single feature of a claim, then that allegation represents the overall feature risk for the first resource system. For example, since features 2, 3, 4, and 5 of claims 601, 603, and 605 have allegations, the vertical feature aggregation of each of the features 2, 3, 4, and 5 results in a negative output indicating suspicion.

In one instance, each of these aggregated features has a pre-determined weightage, and the analysis platform 111 generates an aggregated risk score at the first resource system level for record 607 based on the pre-determined weightage and preconfigured rules. For example, record 607 is assigned an aggregated risk score of 85. The analysis platform 111 performs standard operating procedures to validate the first resource system based on the aggregated risk score. In such a manner, analysis platform 111 provides a technically sophisticated mechanism for determining which first resource system should go through a lean verification process or an extensive onboarding process, thereby ensuring an optimal path between faster onboarding and safeguarding the system against fraudulent first resource systems. For example, the analysis platform 111 recommends an extensive onboarding process for a first resource system with an aggregated risk score that is higher than a pre-determined threshold level. For example, the analysis platform 111 recommends a lean verification process for a first resource system with an aggregated risk score that is lower than the pre-determined threshold level.

The traditional systems simply selected claims with maximum risks and displayed information corresponding to those claims. The traditional systems are technically challenged in analyzing and displaying fraudulent features in other claims. For example, the traditional system simply selected claim 603 with a risk score of 72, highlighted features 2 and 4 as fraudulent, and ignored features 3 and 5 in claims 601 and 605. The analysis platform 111 of system 100 overcomes this technical setback by leveraging a vertical feature aggregation to allow for an enhanced risk score for the first resource system.

Figure 7:
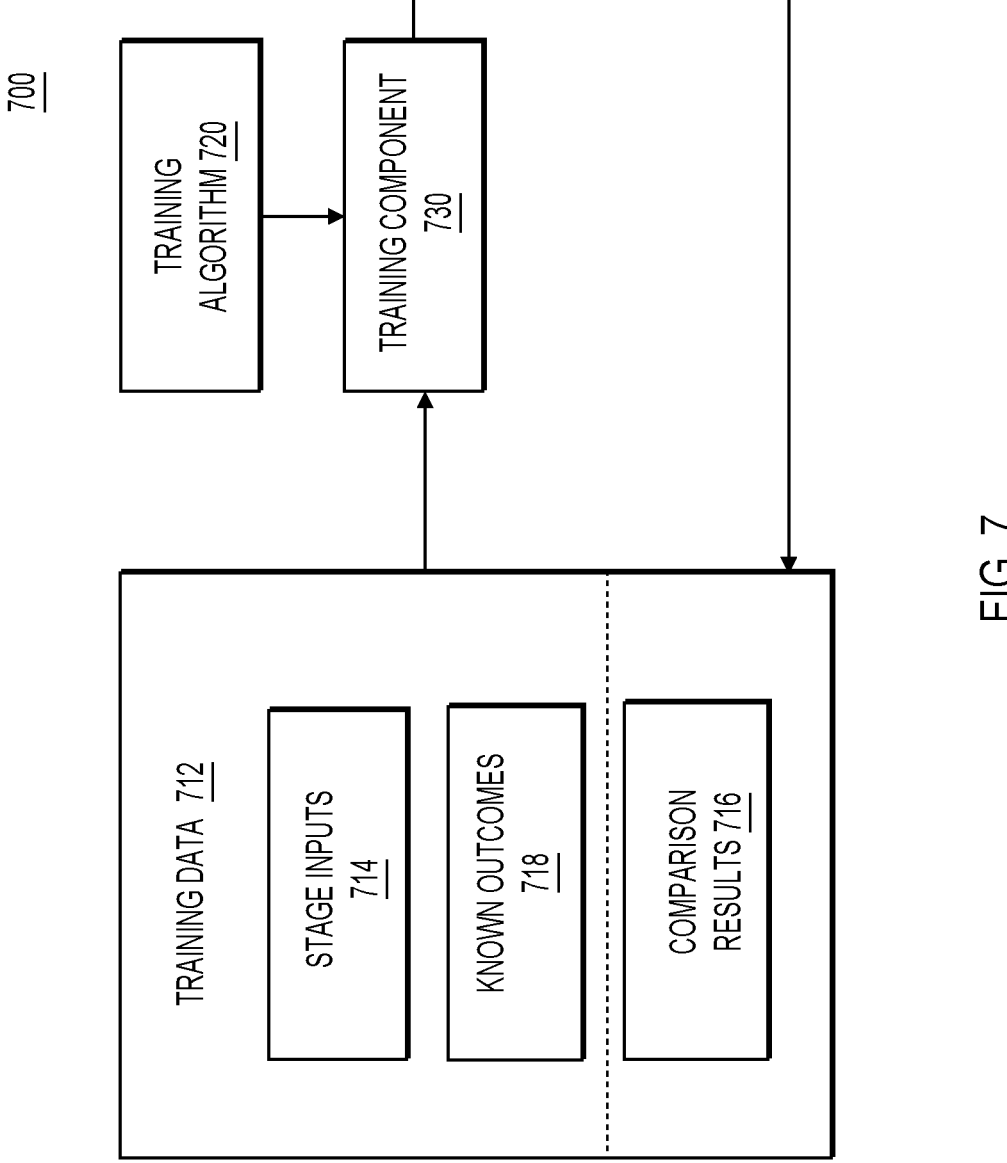
FIG. 7 shows an example machine learning training flow chart.

One or more implementations disclosed herein include and/or are implemented using a machine learning model. For example, one or more of the modules of the analysis platform 111 are implemented using a machine learning model and/or are used to train the machine learning model. A given machine learning model is trained using the training flow chart 700 of FIG. 7. Training data 712 includes one or more of stage inputs 714 and known outcomes 718 related to the machine learning model to be trained. Stage inputs 714 are from any applicable source including text, visual representations, data, values, comparisons, and stage outputs, e.g., one or more outputs from one or more steps from FIG. 2. The known outcomes 718 are included for the machine learning models generated based on supervised or semi-supervised training. An unsupervised machine learning model is not be trained using known outcomes 718. Known outcomes 718 includes known or desired outputs for future inputs similar to or in the same category as stage inputs 714 that do not have corresponding known outputs.

The training data 712 and a training algorithm 720, e.g., one or more of the modules implemented using the machine learning model and/or are used to train the machine learning model, is provided to a training component 730 that applies the training data 712 to the training algorithm 720 to generate the machine learning model. According to an implementation, the training component 730 is provided comparison results 716 that compare a previous output of the corresponding machine learning model to apply the previous result to re-train the machine learning model. The comparison results 716 are used by training component 730 to update the corresponding machine learning model. The training algorithm 720 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the process illustrated in FIGS. 2-6 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 8 illustrates an implementation of a computer system that executes techniques presented herein. The computer system 800 includes a set of instructions that are executed to cause the computer system 800 to perform any one or more of the methods or computer based functions disclosed herein. The computer system 800 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 800 operates in the capacity of a server or as a client user computer in a server-client user network environment, or as a peer computer system in a peer-to-peer (or distributed) network environment. The computer system 800 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 is implemented using electronic devices that provide voice, video, or data communication. Further, while the computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 includes a processor 802, e.g., a central processing unit (CPU), a graphics processing unit (GPU), or both. The processor 802 is a component in a variety of systems. For example, the processor 802 is part of a standard personal computer or a workstation. The processor 802 is one or more processors, digital signal processors, application specific integrated circuits, field programmable gate arrays, servers, networks, digital circuits, analog circuits, combinations thereof, or other now known or later developed devices for analyzing and processing data. The processor 802 implements a software program, such as code generated manually (i.e., programmed).

The computer system 800 includes a memory 804 that communicates via bus 808. Memory 804 is a main memory, a static memory, or a dynamic memory. Memory 804 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. Memory 804 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts, or tasks illustrated in the figures or described herein are performed by processor 802 executing the instructions stored in memory 804. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 800 further includes a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 acts as an interface for the user to see the functioning of the processor 802, or specifically as an interface with the software stored in the memory 804 or in the drive unit 806.

Additionally or alternatively, the computer system 800 includes an input/output device 812 configured to allow a user to interact with any of the components of the computer system 800. The input/output device 812 is a number pad, a keyboard, a cursor control device, such as a mouse, a joystick, touch screen display, remote control, or any other device operative to interact with the computer system 800.

The computer system 800 also includes the drive unit 806 implemented as a disk or optical drive. The drive unit 806 includes a computer-readable medium 822 in which one or more sets of instructions 824, e.g. software, is embedded. Further, the sets of instructions 824 embodies one or more of the methods or logic as described herein. Instructions 824 resides completely or partially within memory 804 and/or within processor 802 during execution by the computer system 800. The memory 804 and the processor 802 also include computer-readable media as discussed above.

In some systems, computer-readable medium 822 includes the set of instructions 824 or receives and executes the set of instructions 824 responsive to a propagated signal so that a device connected to network 830 communicates voice, video, audio, images, or any other data over network 830. Further, the sets of instructions 824 are transmitted or received over the network 830 via the communication port or interface 820, and/or using the bus 808. The communication port or interface 820 is a part of the processor 802 or is a separate component. The communication port or interface 820 is created in software or is a physical connection in hardware. The communication port or interface 820 is configured to connect with the network 830, external media, display 810, or any other components in the computer system 800, or combinations thereof. The connection with network 830 is a physical connection, such as a wired Ethernet connection, or is established wirelessly as discussed below. Likewise, the additional connections with other components of the computer system 800 are physical connections or are established wirelessly. Network 830 alternatively be directly connected to the bus 808.

While the computer-readable medium 822 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 822 is non-transitory, and may be tangible.

The computer-readable medium 822 includes a solid-state memory such as a memory card or other package that houses one or more non-volatile read-only memories. The computer-readable medium 822 is a random-access memory or other volatile re-writable memory. Additionally or alternatively, the computer-readable medium 822 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 800 is connected to network 830. Network 830 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 830 includes wide area networks (WAN), such as the Internet, local area networks (LAN), campus area networks, metropolitan area networks, a direct connection such as through a Universal Serial Bus (USB) port, or any other networks that allows for data communication. Network 830 is configured to couple one computing device to another computing device to enable communication of data between the devices. Network 830 is generally enabled to employ any form of machine-readable media for communicating information from one device to another. Network 830 includes communication methods by which information travels between computing devices. Network 830 is divided into sub-networks. The sub-networks allow access to all of the other components connected thereto or the sub-networks restrict access between the components. Network 830 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the present disclosure, various features are sometimes grouped together in a single embodiment, figure, or description thereof for the purpose of streamlining the disclosure and aiding in the understanding of one or more of the various inventive aspects. This method of the present disclosure, however, is not to be interpreted as reflecting an intention that the claimed embodiments require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure are practiced without these specific details. In other instances, well-known methods, structures and techniques have not been shown in detail in order not to obscure an understanding of this description.

Thus, while there has been described what are believed to be the preferred embodiments of the present disclosure, those skilled in the art will recognize that other and further modifications are made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method comprising: receiving, by one or more processors, a dataset that includes a first subset and a second subset associated with a first resource system; down-sampling, by the one or more processors, the first subset but not the second subset; generating, by the one or more processors, a first feature for a machine learning model based on the down-sampled first subset; generating, by the one or more processors, a second feature for the machine learning model based on the second subset; generating, by the one or more processors and via input of at least one of the first feature or the second feature into the machine learning model that is trained to output a fraudulent measure, one or more data objects indicative of validating the fraudulent measure; and initiating, by the one or more processors, performance of one or more prediction-based actions in response to the generating.

Example 2. The computer-implemented method of example 1, wherein down-sampling the first subset comprises: standardizing, by the one or more processors, the first subset; and transforming, by the one or more processors, the standardized first subset into a unique hash key for matching with a stored data string.

Example 3. The computer-implemented method of example 2, wherein generating the first feature for the machine learning model comprises: determining, by the one or more processors, the unique hash key matches the stored data string; and generating, by the one or more processors, the first feature indicating the match for inputting into the machine learning model.

Example 4. The computer-implemented method of any of examples 1-3, further comprising: determining, by the one or more processors, one or more first risk scores based on the first feature and the second feature; determining, by the one or more processors, a second risk score for the first resource system based on the one or more first risk scores; comparing, by the one or more processors, the second risk score to a pre-determined threshold; and determining, by the one or more processors, whether to transmit the one or more data objects to one or more second resource systems based on the comparison.

Example 5. The computer-implemented method of example 4, wherein the first feature and the second feature are associated with one or more requests by the first resource system.

Example 6. The computer-implemented method of any of examples 4-5, wherein initiating the performance of the one or more prediction-based actions comprises: transmitting, by the one or more processors, the one or more data objects to the one or more second resource systems for performing one or more recommended actions; and receiving, by the one or more processors, one or more results from the one or more second resource systems, the one or more results determined by the one or more second resource systems based on the one or more recommended actions.

Example 7. The computer-implemented method of example 6, further comprising: determining, by the one or more processors, the first resource system as fraudulent or genuine based on the one or more results.

Example 8. The computer-implemented method of any of examples 6-7, further comprising: monitoring, by the one or more processors, a progress of each of the one or more recommended actions at the one or more second resource systems; and querying, by the one or more processors, a second resource system upon determining a pre-determined time threshold associated with a corresponding recommended action has passed.

Example 9. The computer-implemented method of any of examples 1-8, wherein the one or more data objects include one or more recommended actions for verifying authenticity of the first resource system.

Example 10. The computer-implemented method of example 9, wherein the one or more recommended actions include one or more of document review utilizing an optical character recognition technique, review of one or more locations associated with the first resource system utilizing a location-based technology, or review of one or more entities associated with the dataset.

Example 11. The computer-implemented method of any of examples 1-10, wherein the dataset includes one or more of past request data, past fraud data, investigation data, location data, network data, association data, or flagged resource systems data.

Example 12. The computer-implemented method of any of examples 1-11, wherein the machine learning model is a supervised machine learning model.

Example 13. A system comprising: one or more processors; and at least one non-transitory computer readable medium storing instructions which, when executed by the one or more processors, cause the one or more processors to perform operations comprising: receiving a dataset that includes a first subset and a second subset associated with a first resource system; down-sampling the first subset but not the second subset; generating a first feature for a machine learning model based on the down-sampled first subset; generating a second feature for the machine learning model based on the second subset; generating, via input of at least one of the first feature or the second feature into the machine learning model that is trained to output a fraudulent measure, one or more data objects indicative of validating the fraudulent measure; and initiating performance of one or more prediction-based actions in response to the generating.

Example 14. The system of example 13, wherein down-sampling the first subset comprises: standardizing the first subset; and transforming the standardized first subset into a unique hash key for matching with a stored data string.

Example 15. The system of example 14, wherein generating the first feature for the machine learning model comprises: determining the unique hash key matches the stored data string; and generating the first feature indicating the match for inputting into the machine learning model.

Example 16. The system of any of examples 13-15, further comprising: determining one or more first risk scores based on the first feature and the second feature, wherein the first feature and the second feature are associated with one or more requests by the first resource system; determining a second risk score for the first resource system based on the one or more first risk scores; comparing the second risk score to a pre-determined threshold; and determining whether to transmit the one or more data objects to one or more second resource systems based on the comparison.

Example 17. The system of example 16, wherein initiating the performance of the one or more prediction-based actions comprises: transmitting the one or more data objects to the one or more second resource systems for performing one or more recommended actions; and receiving one or more results from the one or more second resource systems, the one or more results determined by the one or more second resource systems based on the one or more recommended actions.

Example 18. A non-transitory computer readable medium, the non-transitory computer readable medium storing instructions which, when executed by one or more processors, cause the one or more processors to perform operations comprising: receiving a dataset that includes a first subset and a second subset associated with a first resource system; down-sampling the first subset but not the second subset; generating a first feature for a machine learning model based on the down-sampled first subset; generating a second feature for the machine learning model based on the second subset; generating, via input of at least one of the first feature or the second feature into the machine learning model that is trained to output a fraudulent measure, one or more data objects indicative of validating the fraudulent measure; and initiating performance of one or more prediction-based actions in response to the generating.

Example 19. The non-transitory computer readable medium of example 18, wherein down-sampling the first subset for generating the first feature for the machine learning model comprises: standardizing the first subset; transforming the standardized first subset into a unique hash key for matching with a stored data string; determining the unique hash key matches the stored data string; and generating the first feature indicating the match for inputting into the machine learning model.

Example 20. The non-transitory computer readable medium of any of examples 18-19, further comprising: determining one or more first risk scores based on the first feature and the second feature, wherein the first feature and the second feature are associated with one or more requests by the first resource system; determining a second risk score for the first resource system based on the one or more first risk scores; comparing the second risk score to a pre-determined threshold; and determining whether to transmit the one or more data objects to one or more second resource systems based on the comparison.

What is claimed is:

1. A computer-implemented method comprising:
receiving, by one or more processors, a dataset that includes a first subset and a second subset associated with a first resource system;
down-sampling, by the one or more processors, the first subset but not the second subset, wherein down-sampling the first subset includes:
standardizing, by the one or more processors, the first subset; and
transforming, by the one or more processors, the standardized first subset into a unique hash key for matching with a stored data string;
generating, by the one or more processors, a first feature for a machine learning model based on the down-sampled first subset;
generating, by the one or more processors, a second feature for the machine learning model based on the second subset;
generating, by the one or more processors and via input of at least one of the first feature or the second feature into the machine learning model that is trained to output a fraudulent measure, one or more data objects indicative of validating the fraudulent measure; and
initiating, by the one or more processors, performance of one or more prediction-based actions in response to the generating of the one or more data objects.

2. The computer-implemented method of claim 1, wherein generating the first feature for the machine learning model comprises:
determining, by the one or more processors, the unique hash key matches the stored data string; and
generating, by the one or more processors, the first feature indicating the match for inputting into the machine learning model.

3. The computer-implemented method of claim 1, further comprising:
determining, by the one or more processors, one or more first risk scores based on the first feature and the second feature;
determining, by the one or more processors, a second risk score for the first resource system based on the one or more first risk scores;
comparing, by the one or more processors, the second risk score to a pre-determined threshold; and
determining, by the one or more processors, whether to transmit the one or more data objects to one or more second resource systems based on the comparing.

4. The computer-implemented method of claim 3, wherein the first feature and the second feature are associated with one or more requests by the first resource system.

5. The computer-implemented method of claim 3, wherein initiating the performance of the one or more prediction-based actions comprises:
transmitting, by the one or more processors, the one or more data objects to the one or more second resource systems for performing one or more recommended actions; and
receiving, by the one or more processors, one or more results from the one or more second resource systems, the one or more results determined by the one or more second resource systems based on the one or more recommended actions.

6. The computer-implemented method of claim 5, further comprising:
determining, by the one or more processors, the first resource system as fraudulent or genuine based on the one or more results.

7. The computer-implemented method of claim 5, further comprising:
monitoring, by the one or more processors, a progress of each of the one or more recommended actions at the one or more second resource systems; and
querying, by the one or more processors, a second resource system upon determining a pre-determined time threshold associated with a corresponding recommended action has passed.

8. The computer-implemented method of claim 1, wherein the one or more data objects include one or more recommended actions for verifying authenticity of the first resource system.

9. The computer-implemented method of claim 8, wherein the one or more recommended actions include one or more of document review utilizing an optical character recognition technique, review of one or more locations associated with the first resource system utilizing a location-based technology, or review of one or more entities associated with the dataset.

10. The computer-implemented method of claim 1, wherein the dataset includes one or more of past request data, past fraud data, investigation data, location data, network data, association data, or flagged resource systems data.

11. The computer-implemented method of claim 1, wherein the machine learning model is a supervised machine learning model.

12. A system comprising:
one or more processors; and
at least one non-transitory computer readable medium storing instructions which, when executed by the one or more processors, cause the one or more processors to perform operations comprising:
receiving a dataset that includes a first subset and a second subset associated with a first resource system;
down-sampling the first subset but not the second subset, wherein down-sampling the first subset includes:
standardizing the first subset; and
transforming the standardized first subset into a unique hash key for matching with a stored data string;
generating a first feature for a machine learning model based on the down-sampled first subset;
generating a second feature for the machine learning model based on the second subset;
generating, via input of at least one of the first feature or the second feature into the machine learning model that is trained to output a fraudulent measure, one or more data objects indicative of validating the fraudulent measure; and initiating performance of one or more prediction-based actions in response to the generating of the one or more data objects.

13. The system of claim 12, wherein generating the first feature for the machine learning model comprises:

determining the unique hash key matches the stored data string; and generating the first feature indicating the match for inputting into the machine learning model.

14. The system of claim 12, further comprising:

determining one or more first risk scores based on the first feature and the second feature, wherein the first feature and the second feature are associated with one or more requests by the first resource system;

determining a second risk score for the first resource system based on the one or more first risk scores;

comparing the second risk score to a pre-determined threshold; and determining whether to transmit the one or more data objects to one or more second resource systems based on the comparing.

15. The system of claim 14, wherein initiating the performance of the one or more prediction-based actions comprises:

transmitting the one or more data objects to the one or more second resource systems for performing one or more recommended actions; and receiving one or more results from the one or more second resource systems, the one or more results determined by the one or more second resource systems based on the one or more recommended actions.

16. At least one non-transitory computer readable medium, the at least one non-transitory computer readable medium storing instructions which, when executed by one or more processors, cause the one or more processors to perform operations comprising:

receiving a dataset that includes a first subset and a second subset associated with a first resource system;

down-sampling the first subset but not the second subset, wherein down-sampling the first subset includes:

standardizing the first subset; and transforming the standardized first subset into a unique hash key for matching with a stored data string;

generating a first feature for a machine learning model based on the down-sampled first subset;

generating a second feature for the machine learning model based on the second subset;

generating, via input of at least one of the first feature or the second feature into the machine learning model that is trained to output a fraudulent measure, one or more data objects indicative of validating the fraudulent measure; and initiating performance of one or more prediction-based actions in response to the generating of the one or more data objects.

17. The at least one non-transitory computer readable medium of claim 16, wherein generating the first feature for the machine learning model comprises:

determining the unique hash key matches the stored data string; and generating the first feature indicating the match for inputting into the machine learning model.

18. The at least one non-transitory computer readable medium of claim 16, further comprising:

determining one or more first risk scores based on the first feature and the second feature, wherein the first feature and the second feature are associated with one or more requests by the first resource system;

determining a second risk score for the first resource system based on the one or more first risk scores;

comparing the second risk score to a pre-determined threshold; and determining whether to transmit the one or more data objects to one or more second resource systems based on the comparing.

* * * * *